RECORD CHANGER

Filed July 27, 1966

Inventors:
Ernest O.P. Tatter
Philip Vazzano
By Hofgren, Wegner,
Allen, Stellman & McCord Attys

RECORD CHANGER 3,452,992

RECORD CHANGER

Ernest O. P. Tatter, Addison, and Philip Vazzano, Des Plaines, Ill., assignors to Warwick Electronics Inc., a corporation of Delaware Filed July 27, 1966, Ser. No. 568,328
Int. Cl. G11b *17/10*
U.S. Cl. 274—10 17 Claims

ABSTRACT OF THE DISCLOSURE

A record changer having a turntable with a spindle for support and centering of records with a plurality of record hole engaging members associated with the spindle adjacent the turntable and with each member positioned to engage the hole of one of a plurality of records stacked on the turntable to hold the records firmly associated with the spindle. An adapter for the spindle to enable playing of large hole records when the turntable is disposed for playing records at an angle with the adapter having a thin upwardly extending pickup member on one side of the adapter body to move into the center opening of a record and thread the record into concentric alignment with the lower part of the adapter body adjacent the turntable and a takeup member pivoted on the adapter body to engage the record supported on the turntable.

This invention relates in general to record changers, and more particularly to a record changer for playing records disposed other than horizontally.

Record changers for playing records in an inclined, near vertical position are known to those skilled in the art, and an exemplary form of such record changer is disclosed in U.S. Patent 3,163,427 to E. O. P. Tatter. When playing records in a position other than horizontal, it is necessary to provide take up means engageable with the center hole of the records on the turntable to prevent the records from moving relative to the turntable, as tends to occur due to the difference in size between the record holes and the spindle. In the above mentioned patent, take up means are disclosed associated with a small hole record spindle, as well as with an adapter structure associated with the small hole spindle enabling the playing of large hole records. While the take up means disclosed in the Tatter patent has in general functioned satisfactorily, it has been found desirable when a plurality of small hole records are present on a turntable to provide individual take up members for each record. This enables each of the records in a record stack to be positioned generally uniformly with respect to the small hole spindle and the turntable.

Accordingly, it is one of the objects of the present invention to provide a record changer for playing records in a position other than horizontal with separate record hole take up means for each of the records on a turntable.

Another object of the invention is to provide a record changer as described in the preceding paragraph with separate biasing means for each of the record hole take up members, so that each of the record hole take up members will be urged into an exposed position outwardly of a small hole record spindle with a force that is independent of each of the other record hole take up members.

A further object of the invention is to provide a record changer as described above with improved means for moving the record hole take up members to a retracted position within the small hole spindle during a record change cycle.

Still another object of the invention is to provide a novel turntable hub and spindle construction for accommodating the plurality of record hole take up members mentioned above.

A related object is to provide a spindle as described above with a rotation portion, and to mount the record hole take up members on the rotating spindle portion to minimize friction and wear between the records and the spindle.

A still further object of the invention is to provide a novel spindle adapter structure for use with a record changer for playing large hole records in a position other than horizontal.

A related object is to provide a spindle adapter as described in the preceding paragraph with eccentric means for threading large hole records supported on the small hole spindle downwardly of the adapter to the turntable.

A further related object is to provide a spindle adapter as described above with take up means engageable within the center hole of a large hole record and to utilize the actuating means for the take up members of the small hole spindle to move the take up means of the adapter to a retracted position during a record change cycle.

These and other objects of the invention will hereinafter become more fully apparent from the following description taken in connection with the annexed drawings wherein.

Figure 1:
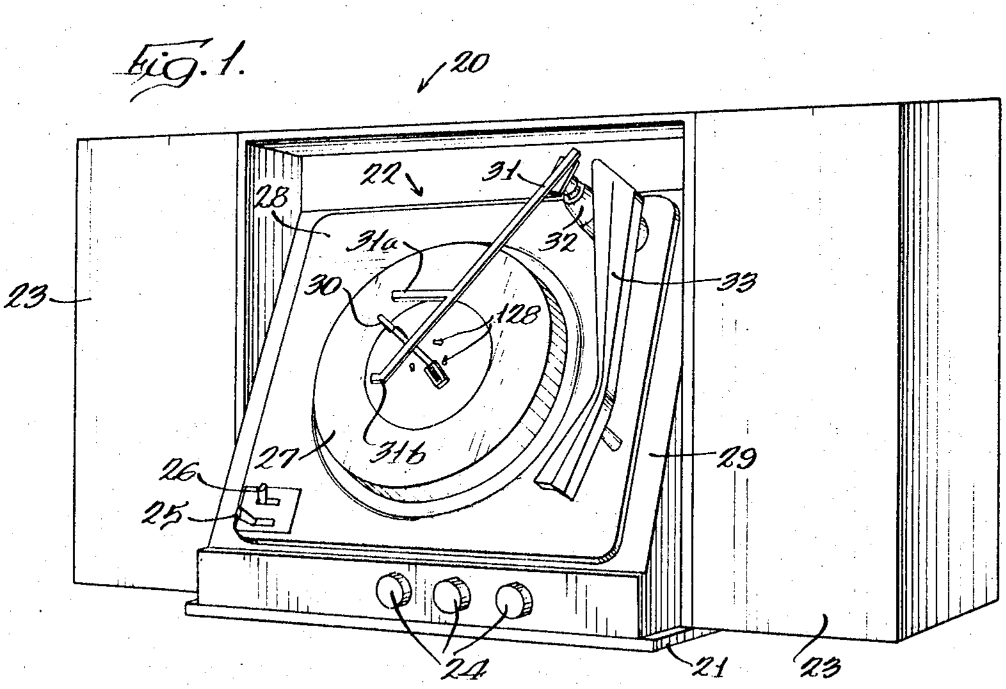
FIG. 1 is a front perspective view of a preferred record changer embodiment with the components thereof arranged for playing of records in a nearly vertical disposition.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Referring now to the drawings, wherein like reference characters designate like or corresponding parts throughout several views, a phonograph unit is shown generally at 20 in FIG. 1, and includes a housing 21 supporting a record changer 22 therein. Speaker wings 23 are preferably hingedly connected to opposite sides of housing 21, so that they may be folded over the front of the housing to provide a compact portable unit. Suitable controls 24 may be provided on the front of the housing 21, as is well known in the art, for controlling volume, tone and loudness. Additional controls 25 and 26 are provided at one corner of the record changer 22 for selection of the desired rotational speed for turntable 27 and for on-off operation of the record changer. A motor M (FIG. 3) is provided for rotating the turntable 27, and is connected thereto through a suitable speed change mechanism as is well known in the art.

Record changer 22 includes a motorboard 28 that rotatably supports turntable 27 by means to be hereafter described in detail. Motorboard 28 is mounted on an inclined, near vertical surface 29 of housing 21 for playing of records in an inclined position. A small hole spindle 30 extends upwardly from turntable 27 centrally thereof, and is adapted to support a stack of records. A pressure arm 31 is mounted for pivotal movement on a support 32 that is secured to the motorboard 28, and pressure arm 31 includes portions 31*a* and 31*b* adapted to be positioned on opposite sides of the spindle 30 for balancing a stack of records that is supported on the spindle. A tone arm 33 is also pivotally mounted on support 32 and carries a stylus assembly (not shown) for tracking the spiral groove of a record being played.

Figure 6:
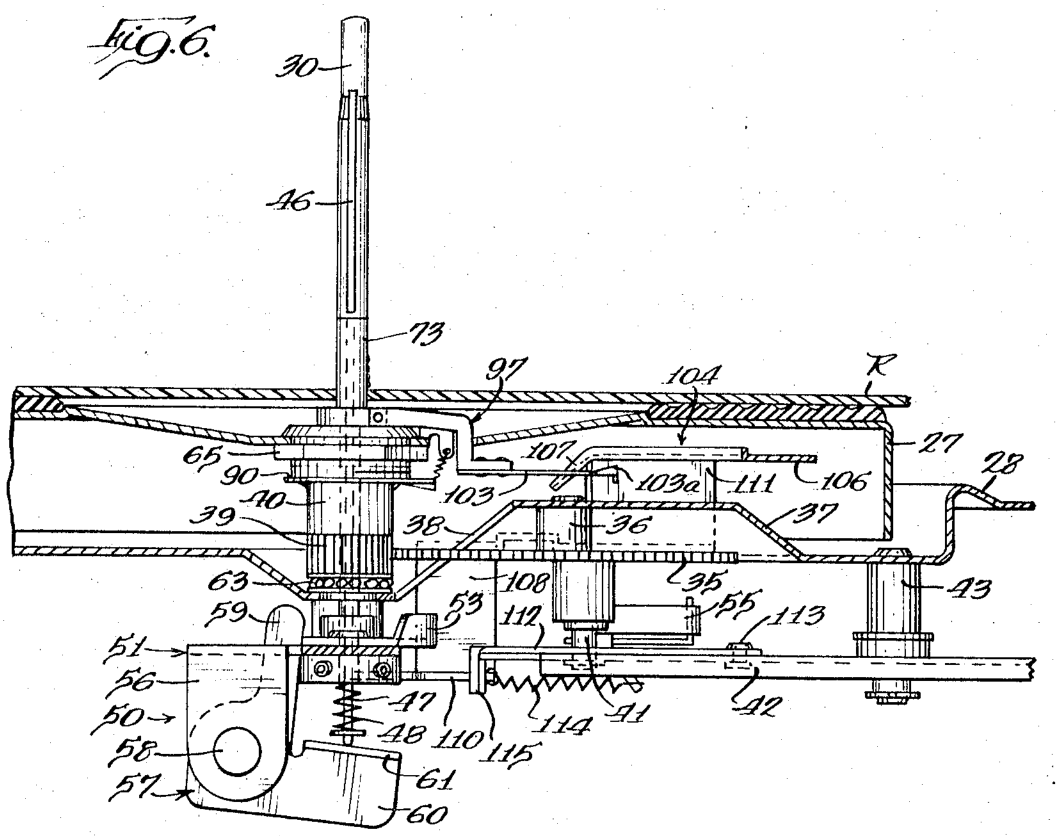
FIG. 6 is a sectional view taken generally along line 6—6 of FIG. 4.

The record changer 22 includes means for automatically ejecting the lowermost record in the record stack on spindle 30 when the playing of a record on the turntable 27 has been completed, so that each of the records in the stack will be sequentially played. The record change cycle mechanism of the present invention may be the same as that disclosed in copending application Ser. No. 402,462 of Reed et al., assigned to the assignee of the present application, now Patent No. 3,394,938. The record change mechanism includes a cycle gear 35 having a hub 36 rotatably mounted upon an upraised portion 37 of the motorboard 28. A velocity trip mechanism, not shown herein but described in detail in the above mentioned Reed et al. application, is mounted on the upper surface of the cycle gear 35, and is adapted to be actuated by a lever (not shown) connected with the tone arm, as the tone arm stylus tracks the relatively widely spaced lead out groove at the inner portion of a record being played. Gear 35 extends through an opening 38 (FIG. 6) in motorboard portion 37, and is rotated by a gear portion 39 of spindle hub 40 when the velocity trip mechanism has been actuated.

Figure 5:
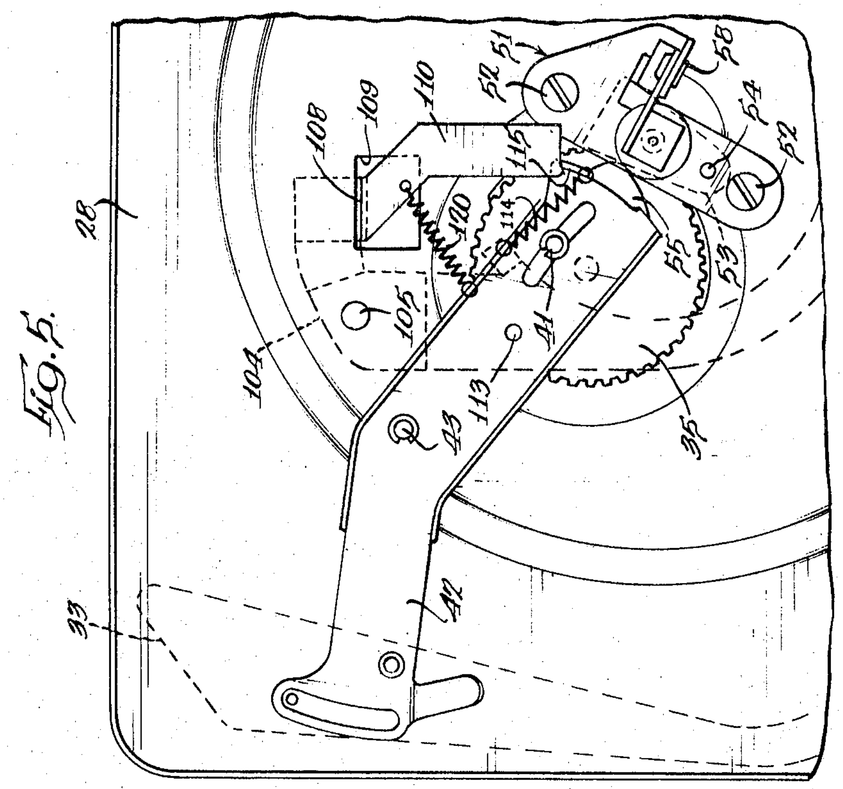
FIG. 5 is a bottom fragmentary bottom plan view similar to FIG. 4, and illustrating certain elements of the changer during a record change cycle.

A main opertor, in the form of a rocker arm 42, is pivotally mounted to the motorboard 28 at 43, and is pivoted by a drive pin 41 extending downwardly from cycle gear 35. During a record change cycle, cycle gear 35 rotates to initially pivot rocker arm 42 in a counterclockwise direction, as viewed from the bottom of the record changer, from the position of FIG. 4 to the position of FIG. 5. As the cycle gear 35 continues to rotate, the rocker arm 42 is pivoted in a clockwise direction back to the play position shown in FIG. 4. Means are provided for ejecting the lowermost record in a record stack carried by spindle 30 during the record cycle.

The spindle 30 is provided with a spindle shelf 45 intermediate the ends thereof which faces generally upwardly when the record changer is inclined as shown in FIG. 1. A record ejector lever 46 is mounted for vertical and pivotal movement within spindle 30, and the upper end of lever 46 is positioned to sweep across spindle shelf 45 during a record change cycle to eject the lowermost record in a record stack from the spindle. A vertically movable push rod 47 is slidably received within spindle 30 for actuation of lever 46 during a record change cycle, and a spring 48 (FIG. 6) normally urges rod 47 to a retracted position out of engagement with lever 46 during playing of a record.

A push rod lifting mechanism 50 is provided for lifting the rod 47 during a record change cycle, and mechanism 50 includes a support bracket 51 that is secured to the undersurface of the motorboard 28 by screws 52. A lever 53 is pivotally mounted to bracket 51 at 54 for movement in a plane generally parallel to the turntable. Lever 53 is positioned to be engaged by a push off cam 55 on the cycle gear 35 as the gear rotates during a record change cycle. Bracket 51 includes a depending leg 56, and a generally L-shaped lever 57 is pivotally mounted to leg 56 at 58 for movement in a plane generally perpendicular to the turntable. Lever 57 includes a first leg 59 that is positioned to be engaged by lever 53 as lever 53 is pivoted by cam 55. Lever 57 includes a second leg 60 having an outwardly turned flange 61 positioned in alignment with push rod 47, and as lever 57 is pivoted by lever 53. flange 61 moves into engagement with push rod 47 to lift the same and actuate the ejector lever 46 to eject the lowermost record in the record stack.

Figure 8:
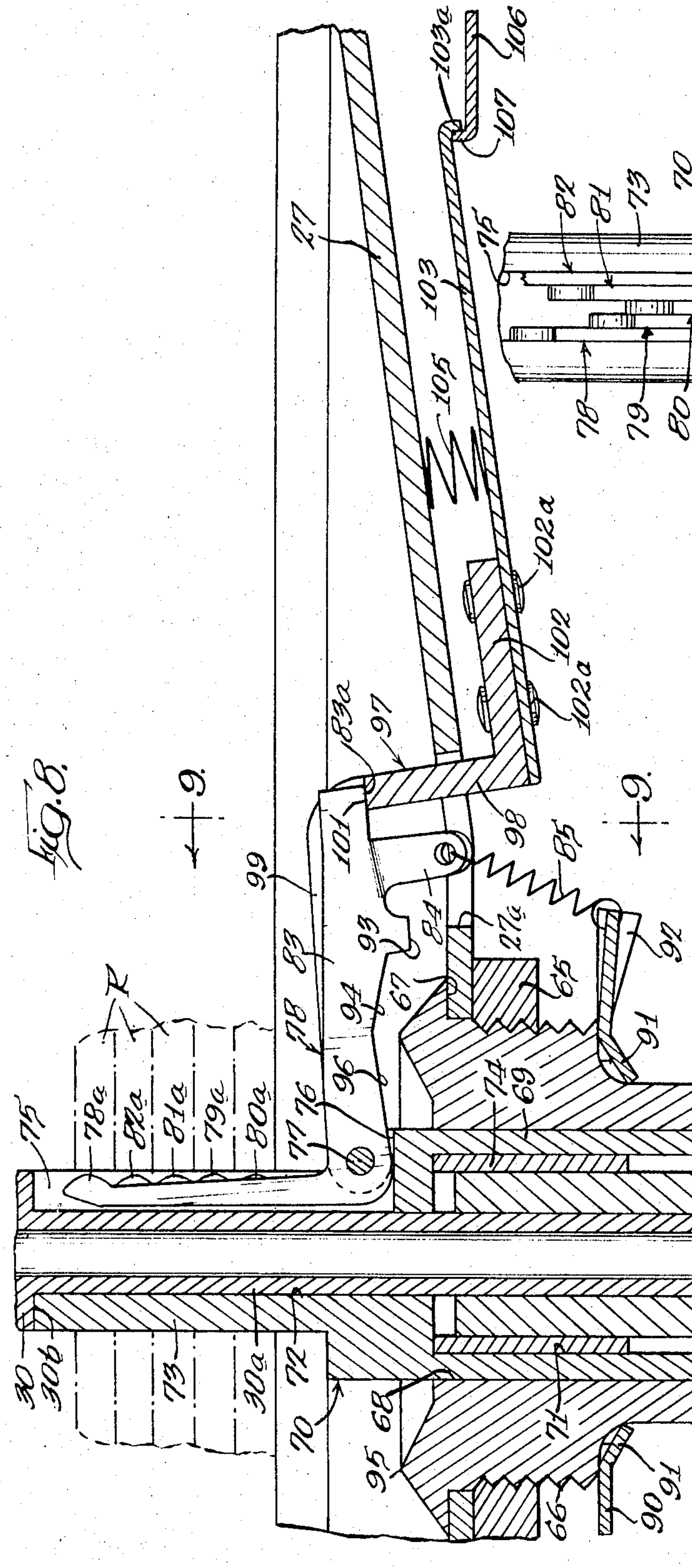
FIG. 8 is a sectional view, taken generally centrally of FIG. 7.
Figure 9:
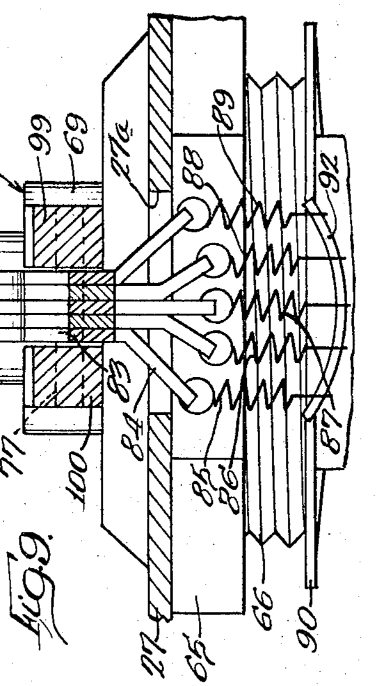
FIG. 9 is a sectional view taken generally along line 9—9 of FIG. 8.

The means mounting the turntable for rotation relative to the spindle 30, and the small hole record take up means will be best understood from a consideration of FIGS. 8 and 9. The lower portion of hub 40 is supported on a bushing 63 (FIG. 6) that is carried by the motorboard. A bearing retainer sleeve 63 surrounds spindle 30 inwardly of hub 40, and is fixed to the motorboard. A bushing 64 is provided between hub 40 and a sleeve 63 to rotatably mount the hub relative to the sleeve. A nut 65 is screwed upon an externally threaded portion 66 of hub 40 to urge a flange 67 on the hub 40 against the turntable 27, so that the hub and turntable are mounted for rotation together. The hub 40 is counterbored at 68, and the enlarged lower portion 69 of a rotatable spindle sleeve 70 is fixedly mounted in counterbore 68, as by a press fit or the like. The lower portion of the sleeve 70 is provided with a bore 71, and a bushing 74 is provided in bore 71 outwardly of the upper end end of sleeve 63 to rotatably mount member 70 relative to the spindle. A central bore 72 in member 70 is rotatably mounted on a reduced portion 30*a* at the lower end of spindle 30. The reduced portion 30*a* of spindle 30 defines a shoulder 30*b*, and a reduced diameter portion 73 of member 70 is positioned below shoulder 30*b*. The upper portion of spindle 30 and the upper portion 73 of member 70 are the same diameter, so that the upper portion 73 of member 70 effecively defines a continuation of the spindle.

A recess 75 is provided in one side of member 70, and extends from the upper portion thereof into the enlarged portion 69. Recess 75 includes a generally planar lower surface 76, and a pivot pin 77 extends across the lower portion of recess 75 parallel with surface 76. A plurality of generally L-shaped record hole take up members 78–82 are pivotally mounted on pin 77. The record hole take up members are each relatively thin, and are nested together in side by side relationship. The members each include a first leg extending generally upwardly from pivot pin 77 in recess 75, and a second leg extending generally outwardly of the recess. The first legs of the members include respective record hole engaging portions 78*a*–82*a* that are each spaced a different amount above the upper surface of the turntable. The record hole engaging portions 78*a*–80*a* are spaced from one another by an amount corresponding to the average thickness of a small hole record, such that each of the record hole engaging portions is positioned to engage within the center hole of a different record on the turntable. The outer surface of the record hole engaging portions 78*a*–82*a* are preferably rounded or convex so as to fit within the center hole of a small hole record.

The second legs of the record hole engaging members 78–82 are each shaped generally the same as the legs 83 of member 78 shown in FIG. 8, so that only leg 83 will be described in detail. Leg 83 includes a downwardly extending spring anchoring portion 84, which is apertured to receive one end of a spring 85. As is seen in FIG. 9, the anchoring portion 84 of leg 83 is inclined outwardly from the other second legs, to facilitate connection of spring 85 to the leg and to provide clearance for the spring. In a like manner, springs 86–89 are connected to the second legs of members 79–82, with the spring anchoring portions of members 79, 81 and 82 also being inclined outwardly to facilitate connection of the springs and to provide clearance therefor. A spring retention ring 90 is secured to hub 40 for rotation therewith by a plurality of inclined fingers 91, and ring 90 is positioned under the threaded portion 66 of hub 40. Ring 90 includes a dished portion 92 at one side thereof in alignment with recess 75, and portion 92 is provided with a plurality of openings to which the lower ends of springs 85–89 are connected. Springs 85–89 extend downwardly through an opening **27*a* in the turntable 27 where the ends thereof are connected to the openings in retention ring 90**, as can be best seen in FIG. 8.

Springs 85–89 yieldably urge the record hole engaging members 78–82 in a clockwise direction, as viewed in FIG. 8, about pivot pin 77 toward an exposed position wherein the record hole engaging portions **78*a*–82*a* engage within the center holes of the records disposed on the spindle. The second leg of each of the record hole take up members is provided with a stop, such as that shown at 93 for member 78, inwardly of the spring anchoring portion, which is engageable with the turntable 27 to limit movement of the record hole engaging members toward the exposed position. The second legs of the record hole engaging members are provided with inclined clearance portions, such as that shown at 94 for member 78, to clear the inclined crown portion 95 or hub 40. A stop surface 96 is provided on leg portion 78 inwardly of the inclined surface 94, and is engageable with the lower surface 76 of the recess 75. Surface 96 cooperates with stop 93** to limit movement of the record hole engaging members toward the exposed position.

Figure 7:
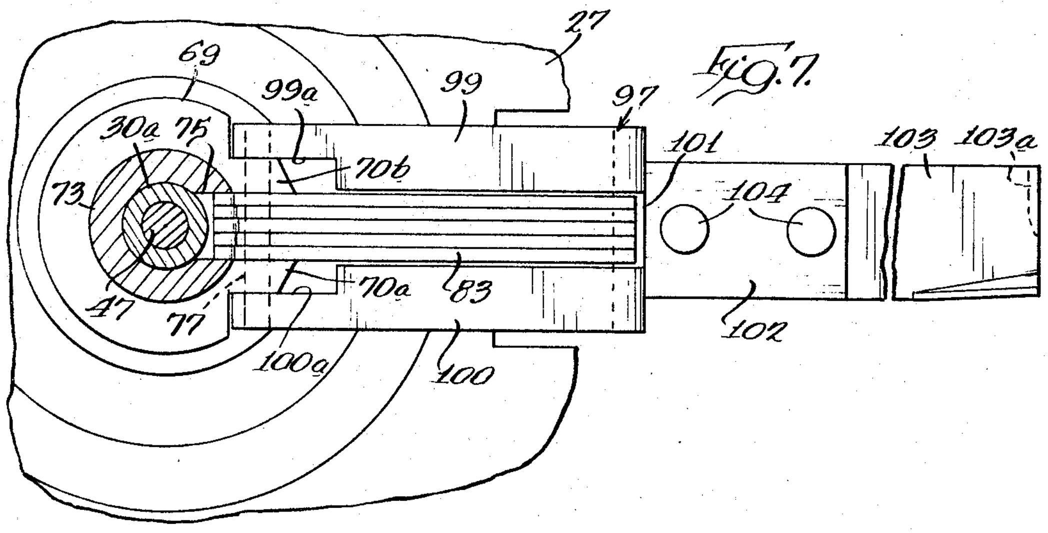
FIG. 7 is an enlarged view taken generally along line 7—7 of FIG. 6, with certain parts broken away for clarity of illustration.

Actuating means is provided for moving the record hole engaging portions **78*a*–82*a* to a retracted position within recess 75 during a record change cycle, so that records ejected from the spindle can pass freely along the spindle to the turntable. For this purpose, a lifter member 97 is provided for engaging each of the members 78–82 to move the portions 78*a*–82*a* to the retracted position. Lifter 97 includes a central, generally upright, portion 98 extending from above to below the turntable 27 through opening 27*a*. A pair of spaced fingers 99 and 100 are provided at opposite sides of central portion 98, and extend generally radially inwardly toward the spindle. The innermost ends of fingers 99 and 100 are of reduced thickness, as is shown at 99*a* and 100*a* in FIG. 7, and these portions embrace projections 70*a* and 70*b* on member 70 at the sides of recess 75. Pivot pin 77 extends through aligned openings in projections 70*a* and 70*b*, as well as through aligned openings in finger portions 99*a* and 100*a* to mount the lifter 97 for pivotal movement. The second leg portions of record hole take up members 78–82 are nested between the fingers 99 and 100 of lifter 97, and abutments, such as that shown at 83*a* in FIG. 8 on member 78, are provided at the outer ends of the second leg portions of the record hole take up members. A shoulder 101 is provided at the upper end of the central portion 98 of lifter 97, and is engageable with the abutments on the second leg portions of the record hole take up members to lift the record hole take up members when the lifter 97 is pivoted in a counterclockwise direction about pin 77. Lifter 97 includes an outwardly extending portion 102 at the lower end of central portion 98, and portion 102 is secured to an actuating arm 103 by rivets 102*a*. A spring 105 is biased between turntable 27 and arm 103 to normally urge lifter 97 in a clockwise direction about pivot pin 77 to a position wherein the shoulder 101 is spaced from the abutments on the record hole take up members. This, of course, will enable the record hole engaging portions 78*a*–82*a* to assume the exposed position under the urging of springs 85–89**.

Means are provided for pivoting the lifter 97 in a counterclockwise direction against the bias of the spring 105 during a record change cycle to move the record hole engaging portions **78*a*–82*a* to the retracted position shown in FIG. 8. For this purpose, an actuating lever 104 is pivotally secured to the motorboard 28 at 105. Lever 104 includes a first portion 106 positioned above the motorboard 28, and having a generally arcuate end portion 106*a* (FIG. 3) with substantial diametrically opposed inclined cam surfaces 107 thereon. Lever 104 includes a further portion 108 that extends downwardly through an opening 109 in motorboard 28, and a still further portion 110 of lever 104 extends inwardly from the lower end of portion 108 toward the spindle 30. A generally L-shaped bracket 111 is secured to the upper surface of the motorboard 28, as by welding or the like, to support the lever 104**.

Figure 3:
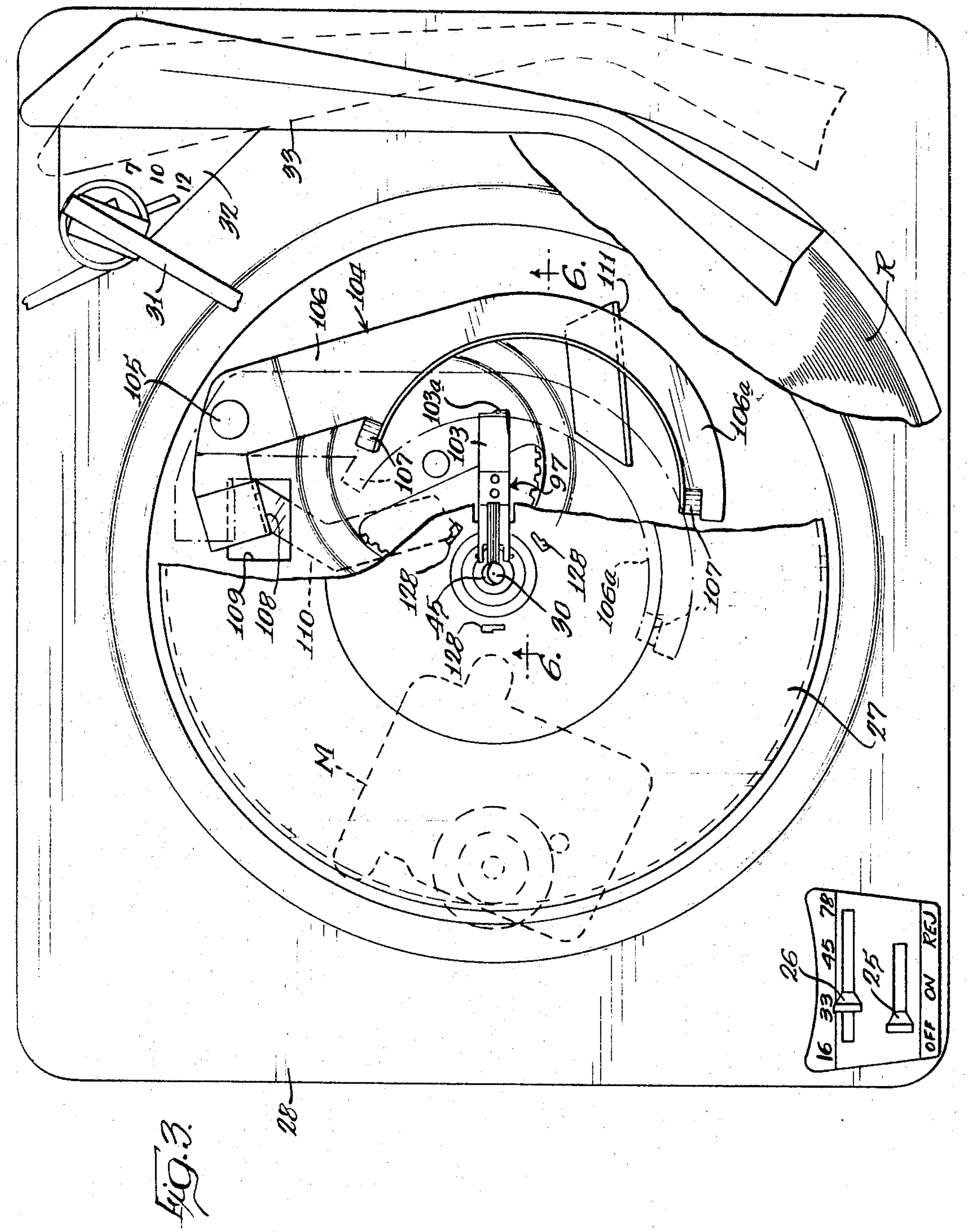
FIG. 3 is an enlarged top plan view of the record changer of the present invention, with certain parts broken away for clarity of illustration, and showing certain elements of the changer in the play position in full lines, and in a record change cycle position in broken lines.
Figure 4:
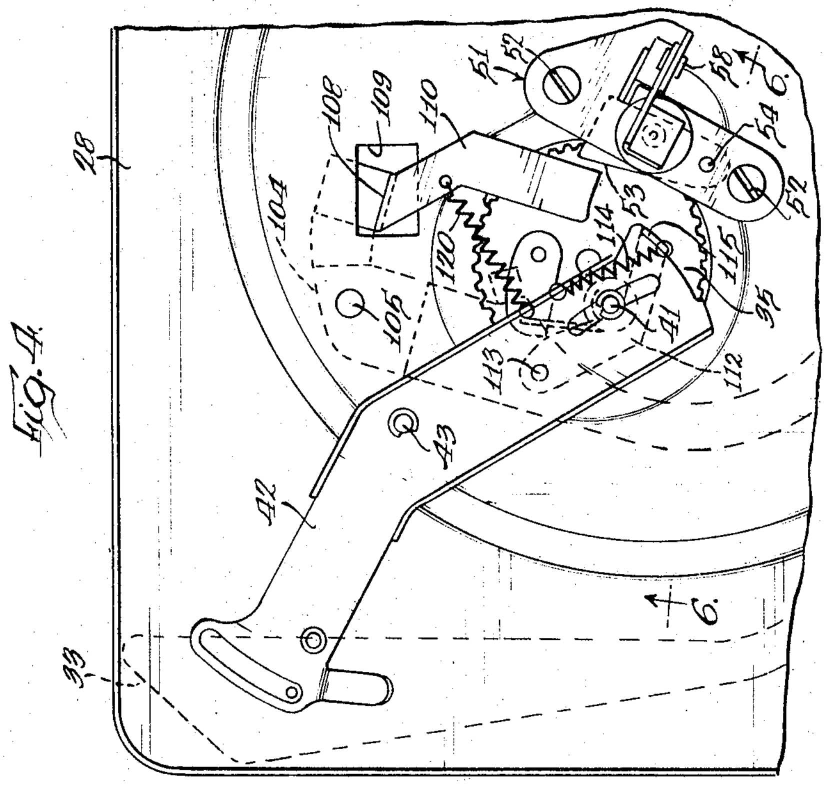
FIG. 4 is a fragmentary bottom plan view illustrating certain elements of the changer in the play position.

The means for pivoting member 104 includes a lever 112 (FIGS. 4 and 5) pivotally mounted on rocker arm 42 at 113 and biased toward the position shown in FIG. 4 by a spring 114. As is described in detail in the above mentioned patent of Reed et al., lever 112 is pivoted by drive pin 41 during a record change cycle as the rocker arm 42 is pivoted. Lever 112 includes a downwardly extending abutment 115 which is positioned to engage the end of portion 110 of lever 104. Thus, during a record change cycle, when rocker arm 42 pivots from the position of FIG. 4 to the position of FIG. 5, abutment 115 moves into engagement with the end of lever portion 110 to pivot the lever 104 in a counterclockwise direction, as viewed from the bottom of the record changer, to move lever 104 from the position of FIG. 4 to the position of FIG. 5. This movement is timed to take place substantially at the same time the push rod 27 is elevated by the lifting lever 57 to eject the lowermost record in the record stack from spindle 30. When the lever 104 is in the position shown in FIG. 5, the cam surfaces 107 on portion 106 are located in the broken line position shown in FIG. 3. Arm 103 includes an inclined cam portion **103*a* at the outer end thereof which is positioned to engage the leading cam surface 107 on the actuating lever portion 106 when the lever 104 is in the broken line position shown in FIG. 3. The cam surface 107 is sloped to pivot the arm 103 upwardly against the bias of spring 105 to move the shoulder 101 on lifter 97 into engagement with the abutments on the outer ends of the second leg portions of the record hole take up members to move the record hole engaging portions 78*a*–82*a* thereof into the retracted position shown in FIG. 8. Cam portion 103*a* rides on the arcuate surface of lever 104 between cam surfaces 107 during movement of the ejected record toward the turntable to retain the record hole engaging portions 78*a*–82*a* in the retracted position. With the record hole engaging portions being located in the retracted position, the ejected record can pass freely down the spindle to the turntable. After record ejection has taken place, cam portion 103*a* rides down the trailing cam surface 107 and a spring 120, that is connected between rocker arm 42 and portion 110 of lever 104, pivots the lever 104 in a clockwise direction, as viewed from the bottom of the record changer, to the position of FIG. 4, where the cam surfaces 107 are spaced outwardly of the path of movement of cam portion 103*a***, as is shown in full lines in FIG. 3.

It will be understood, of course, that the movement of lever 104 from the full line to the broken line position of FIG. 3 is correlated with the movement of the record change structure, so that the cam portion **103*a* is positioned outwardly of the cam portions 107; whereby the lever 104 can be freely pivoted into the full line position without interfering with the cam portion 103*a***.

From the foregoing it will be apparent that applicants have provided a novel record changer which may be played in an inclined, near vertical position, and which will function extremely well even when a plurality of records are present upon the turntable. This is accomplished by having individual record hole take up members for each of the records present upon the turntable, with each of the record hole take up members being yieldably urged outwardly of the spindle for engagement within the center hole of its respective record. Separate spring members are provided for each of the record hole take up members, so that each of the record hole take up members will engage their respective records with a force which is independent of the other record hole take up members. The record hole take up members are each carried by spindle portion which is rotatable with the turntable, so that the records will be positively held for rotation with the turntable, while minimizing wear between the spindle and the records.

Figure 2:
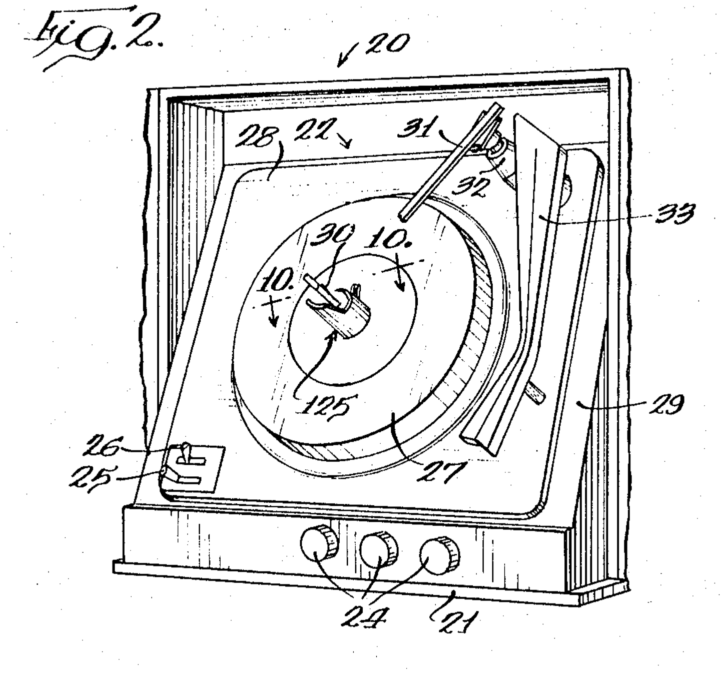
FIG. 2 is a front perspective view similar to FIG. 1, with certain parts broken away for clarity of illustration, and having the spindle adapter of the present invention mounted on the turntable.
Figure 10:
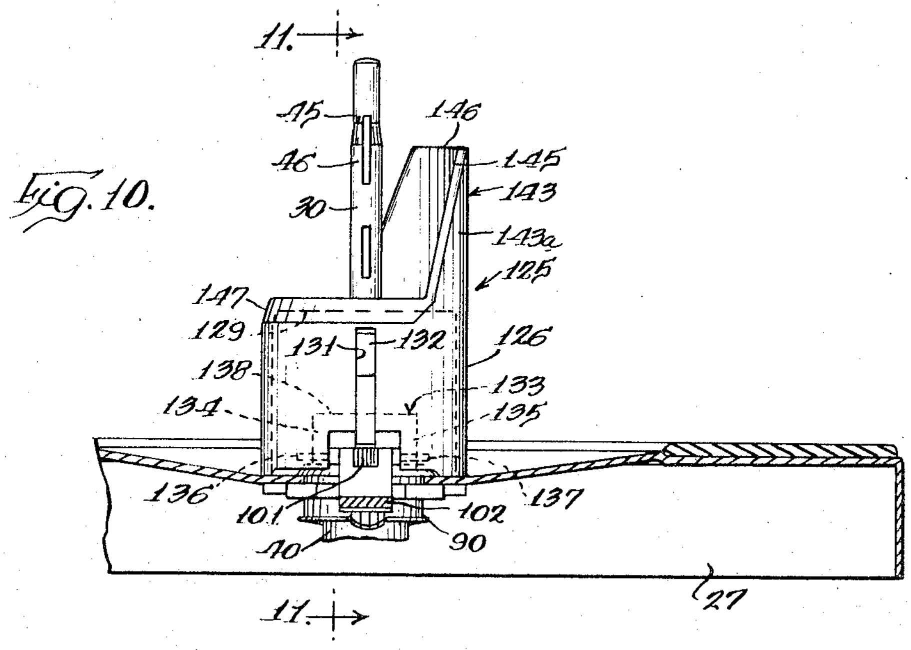
FIG. 10 is an enlarged sectional view taken generally along line 10—10 of FIG. 2.
Figure 11:
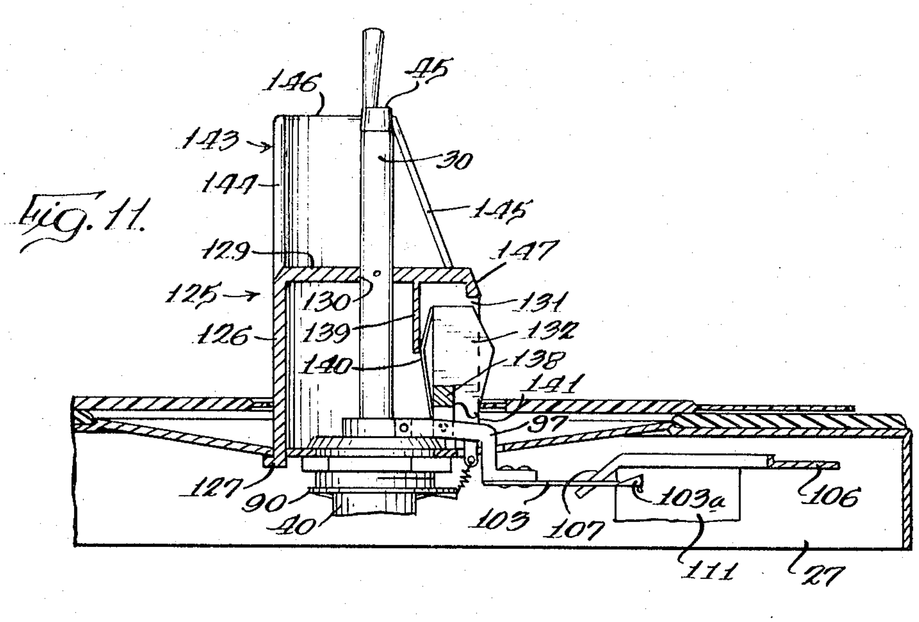
FIG. 11 is a sectional view taken generally along line 11—11 of FIG. 10.

In order to make the above described record changer completely versatile, spindle adapter means are provided for playing records having large center holes. The spindle adapter 125 of the present invention is illustrated in FIGS. 2, 10 and 11. As shown therein, adapter 125 includes a generally cylindrical body portion 126, and a plurality of bayonet type fingers 127 are provided at the lower end of body 126 for engagement with openings 128 in turntable 27 to mount adapter 125 for rotation with the turntable. Body portion 126 is preferably of hollow design, as is best seen in FIG. 11, and the upper portion 129 of body 126 is disposed at right angles with respect to the axis of the body portion. An axially extending hole 130 is provided centrally of portion 129 for slidable insertion of the adapter 125 over the spindle 30.

A slot 131 is provided in one side of adapter body 126, and a record hole take up member 132 is mounted for movement in slot 131 between a retracted position disposed within the body 126 and an exposed position extending outwardly of body 126 through slot 131. Take up member 132 is fixed to a generally U-shaped support member 133 (FIG. 10) having legs 134 and 135 with pins 136 and 137, respectively, extending outwardly therefrom and pivotally mounted in corresponding openings in the adapter body. The take up member 132 extends upwardly generally centrally of a bight portion 138 of support member 133. A wall 139 extends downwardly from the upper portion 129 of adapter body 126 in alignment with slot 131, and a leaf spring 140 is biased between wall 139 and take up member 132 to urge the member outwardly of the adapter body into the exposed position shown in FIG. 11. An abutment 141 extends downwardly from take up member 132 and is positioned generally above the outwardly extending second legs on the small hole spindle take up members 78–82, so that during a record change cycle, the abutment 141 will be engaged by the upper surfaces of the outwardly extending leg portions of the small spindle take up members, when they are lifted, to pivot the take up member 132 into the retracted position within the adapter body 126.

As is evident from FIG. 11, the adapter body 126 terminates a substantial distance below the plane of the spindle shelf 45. Thus, when a stack of large hole records is present on the spindle, they will be supported eccentrically thereon by the engagement of the spindle shelf 45 with the edge of the hole in the lowermost record in the record stack. The records will be balanced on the spindle shelf by the pressure arm 31. A pick up member 143 extends upwardly from adapter body 126 at a side thereof spaced from take up member 132. Pick up member 143 is provided eccentrically of passage 130, and in the illustrated embodiment, member 143 is provided radially outwardly of passage 130 at the edge of upper portion 129. Pick up member 143 is preferably integral with adapter body 126, and as illustrated, member 143 is relatively thin having approximately the same thickness as the outer wall of adapter body 126. The outer surface **143*a* of pick up member 143 is positioned in alignment with the outer surface of adapter body 126, so as to be concentric with small hole spindle 30 when the adapter is placed thereon. The sides 144 and 145 of pick up member 143 converge upwardly to define a slightly tapered member. As is clear from FIGS. 10 and 11, the upper surface 146 of member 143 terminates below the level of the spindle shelf 45. Thus, when a large hole record that is eccentrically supported on spindle shelf 45 is ejected therefrom, once in each revolution the rotating pick up member 143 will engage within the record center hole, and spirally thread the same down the pick up member 143 and the adapter body 126 onto the turntable 27. The upper edge 147 of adapter body 126 is preferably inclined to facilitate passage of records thereover. The pick up member 143 serves to guide ejected records from a position eccentric with respect to spindle 30 into a position concentric therewith. The take up member 132 is, of course, in the retracted position during movement of the ejected record to the turntable, so that the ejected record will pass substantially freely down the adapter 125 to the turntable 27. Once the record is present on the turntable 27, the lifter 97 is pivoted downwardly, so that the spring 140 will move the take up member 132** into the exposed position, where it engages within the center hole of a large hole record to center and retain the same on the turntable while rotating with the record.

We claim:

1. In a record changer having a rotatable turntable which is disposed for playing records at an angle, and a spindle centrally of the turntable, record hole take up means comprising: a recess in said spindle adjacent the turntable, a plurality of record hole engaging members mounted adjacent said spindle for movement between an exposed position outwardly of said spindle immediately above said turntable during record playing and a retracted position within said spindle recess during a record change sequence, each member having a record hole engaging portion spaced from said turntable an amount different from the record hole engaging portions of the other members so that each record hole engaging portion is positioned to engage the hole of one of a plurality of records stacked on said turntable, and means for moving said members between said positions.

2. A record changer as defined in claim 1 in which spring means urge said members toward said exposed position, and wherein actuating means is provided for moving said members to said retracted position during a record change cycle.

3. A record changer as defined in claim 2 in which said spring means includes an individual spring connected to each of said members, and wherein said actuating means are arranged to simultaneously move the members to the retracted position during a record change cycle.

4. A record changer as defined in claim 2 wherein a sleeve is rotatably mounted on a reduced portion of said spindle and is secured to said turntable for rotation therewith, said sleeve having an outer diameter substantially the same as said spindle so as to define an effectively continuous record guiding surface, and said sleeve having a recess therein in which means are provided for pivotally mounting said members.

5. A record changer as defined in claim 4 wherein each of said members is generally L-shaped, with a first leg being provided in said recess and with a second leg extending outwardly of said recess, the first legs of said members having the record hole engaging portions thereon, and said spring means being connected to said second legs.

6. A record changer as defined in claim 5 wherein a spring retainer is mounted for rotation with said turntable, and separate springs are connected between said spring retainer and the second leg of each of said members.

7. A record changer as defined in claim 5 in which the second leg of each member includes an abutment, and wherein said actuating means includes a movably mounted lifter having a portion engageable with said abutments during a record change cycle to pivot said members to the retracted position.

8. A record changer as defined in claim 7 wherein one end of said lifter is pivotally mounted adjacent said recess, and the other end of said lifter is positioned to be engaged by an actuating lever during a record change cycle.

9. A record changer as defined in claim 8 including a motorboard supporting said turntable and an operator movable relative to said motorboard during a record change cycle, said actuating lever being pivotally mounted on said motorboard and having a first portion positioned to be engaged by said operator during a record change cycle and a second portion positioned to engage said other lifter end to move said members into the retracted position.

10. A record changer as defined in claim 9 in which said spindle includes a shelf positioned to engage the edge of a hole in a large hole record to support the same eccentrically on said spindle and a push off member movably mounted in said spindle for ejecting a record during a record change cycle, and an adapter on the spindle with a pick up member extending upwardly eccentrically of said adapter for engaging within the hole of the ejected record to receive the eccentric record and thread the same downwardly onto said turntable to a position concentric with the turntable.

11. A record changer as defined in claim 10 in which a take up member is pivotally mounted on said adapter and is movable between an exposed position wherein a portion thereof is adapted to engage the center hole of a large hole record and a retracted position within said adapter, and wherein spring means urge said take up member toward said exposed position, said take up member having an abutment thereon positioned to be engaged by said lifter during a record change cycle to move said take up member to the retracted position.

12. A record changer as defined in claim 10 wherein said adapter includes a generally cylindrical body, with said pick up member being provided at the upper end of said body at the outer periphery thereof.

13. A spindle adapter for use with a record changer having a rotatable turntable disposed for playing records at an angle, and a spindle of relatively small diameter for records having center holes of correspondingly small diameter, said spindle having a shelf positioned to engage the edge of a hole in a large hole record to support the same eccentrically on said spindle and a movable member engageable with the edge of said record for ejecting the record from said shelf for movement to said turntable, in combination, an adapter body having a rounded outer surface for centering the large hole record, said body having a passage therethrough for placement on said spindle and said body terminating below said spindle shelf to expose said movable member, means on said body for mounting the adapter for rotation with said turntable, a thin upwardly extending pick up member on only one side of said body outwardly of said passage terminating beneath the spindle shelf and having an outer surface aligned with the outer surface of said adapter body, said pick up member being receivable within the center hole of an ejected record which is eccentric to the adapter body to thread the same into concentric alignment with said adapter body as said adapter body and turntable rotate and the record moves downwardly toward the turntable.

14. A spindle adapter as defined in claim 13 wherein said adapter body is generally cylindrical, and includes an inclined surface at the upper end thereof on the side opposite said pick up member.

15. A record changer for playing records, comprising: a motorboard; a turntable rotatably mounted on said motorboard; a small hole record spindle positioned centrally of said turntable, said spindle having a first spindle portion non-rotatable with the turntable for supporting records at a distance from the turntable and a second portion above and adjacent said turntable and secured thereto for rotation therewith and having a recess; means for ejecting a record from said first spindle portion during a record change cycle for downward movement onto said second spindle portion; a plurality of record hole take up members mounted on said second spindle portion for rotation therewith; spring means yieldably urging said members individually toward an exposed position outwardly of said spindle; and means for simultaneously moving each of said members to a retracted position within said spindle recess during a record change cycle.

16. A record changer as defined in claim 15 wherein said last named means includes an abutable actuator rotatable with said turntable, and an operator in fixed position relative to the turntable movable into the path of said actuator during a record change cycle.

17. A spindle adapter as defined in claim 13 including a take up member pivoted on said adapter body and movable between an exposed position outwardly of said adapter body and a retracted position within said body, and means yieldably urging said take up member toward said exposed position.

References Cited

UNITED STATES PATENTS

| | | |
|---|---|---|
| 3,163,427 | 12/1964 | Tatter. |
| 3,300,221 | 1/1967 | Shirley. |
| 3,345,074 | 10/1967 | Estkowski. |
| 3,352,562 | 11/1967 | Hammond. |

SAMUEL S. MATTHEWS, *Primary Examiner.*